W. E. BINKLEY.
WHEEL.
APPLICATION FILED SEPT. 15, 1915.
1,168,996.
Patented Jan. 18, 1916.
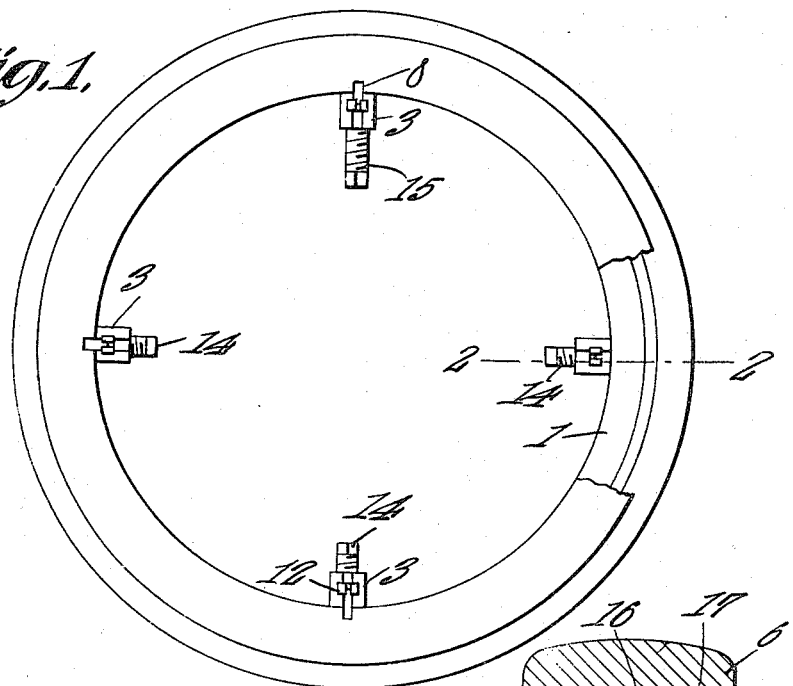
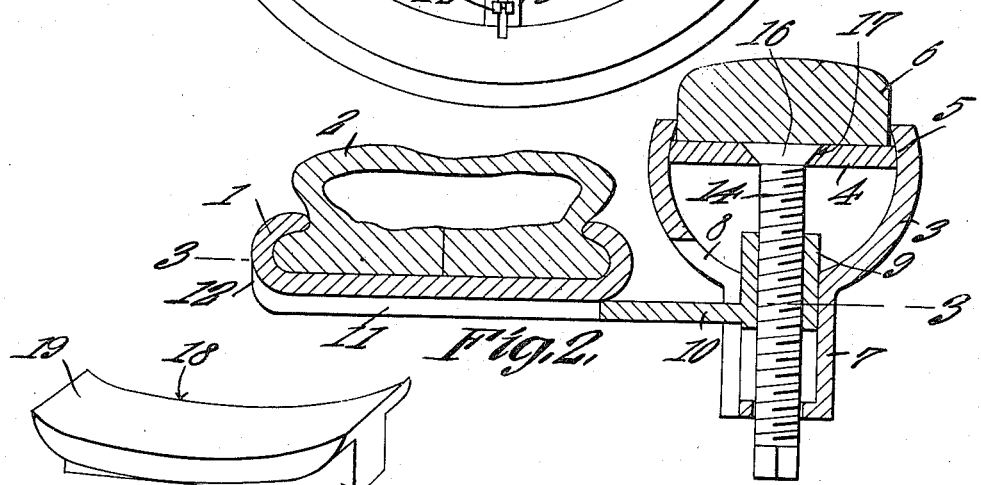
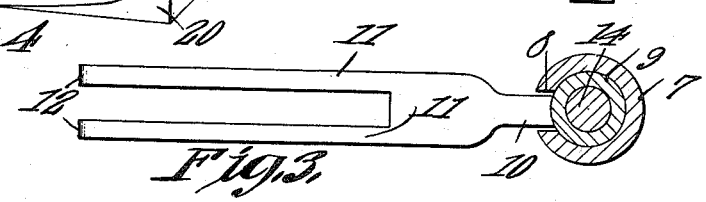
Witnesses
W. E. Binkley,
Inventor
by
Attorneys

UNITED STATES PATENT OFFICE.

WILLIAM E. BINKLEY, OF POLO, ILLINOIS.

WHEEL.

1,168,996. Specification of Letters Patent. Patented Jan. 18, 1916.

Application filed September 15, 1915. Serial No. 50,832.

*To all whom it may concern:*

Be it known that I, WILLIAM E. BINKLEY, a citizen of the United States, residing at Polo, in the county of Ogle and State of Illinois, have invented a new and useful Wheel, of which the following is a specification.

The device forming the subject matter of this application is an emergency wheel adapted to be employed in connection with a wheel of an automobile or other vehicle, when the tire thereon has become deflated or useless.

The invention aims to provide novel means for assembling an auxiliary wheel with the main vehicle wheel detachably.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows in side elevation, an auxiliary wheel constructed in accordance with the present invention, a portion of the main automobile wheel appearing; Fig. 2 is a cross section taken approximately on the line 2—2 of Fig. 1; Fig. 3 is a section taken along the line 3—3 of Fig. 2; Fig. 4 is a perspective depicting a filler block which may be used in order to adapt the device forming the subject matter of this application to wheel rims of different transverse contours.

In the accompanying drawings there is shown a main wheel rim 1 provided with a tire 2 appearing in deflated condition.

In carrying out the present invention there is provided an annular auxiliary rim 3 across which extends a fixed partition 4 defining flanges 5 retaining a tire 6 of any desired sort. The inner curve of the rim 3 is provided with nipples 7. In the nipples 7 and in one side of the rim 3, radial slots 8 are formed. Mounted to move radially of the rim 3 in the nipples 7 are tubular sleeves 9 carrying lateral brackets, each bracket comprising an arm 10 terminated in fingers 11 having projections 12.

The invention comprises a plurality of screws 14 and 15, one screw being denoted by the numeral 15 because (for a purpose to be set forth hereinafter), the same is longer than the other screws which are designated by the reference character 14. The screws 14 and 15 are threaded into the sleeves 9 and at their outer ends are equipped with enlarged heads 16 journaled for rotation in openings 17 formed in the partition 4. The tire 6 bears against the outer end faces of the heads 16 of the screws and, owing to this fact and to the further fact that the openings 17 are countersunk, the screws are prevented from moving endwise when they are rotated, the ends of the screws projecting beyond the ends of the nipples 7, so that the screws may be rotated when desired.

In practical operation, that bracket which is individual to the screw 15 is hooked under the rim 1, the projections 12 engaging one edge of the rim 1. Because this screw 15 is longer than the other screws it may be rotated sufficiently to elevate the main rim 1 and its deflated tire 2 off the ground, the screw 15 and its bracket therefore acting as a jack. Subsequently, the brackets of the other screws are assembled with the rim. When the screws 14 and 15 are rotated, the brackets are caused to move outwardly away from the center of the auxiliary rim, to clamp on the inner curve of the main rim 1, the auxiliary rim 3 thus being firmly and securely engaged with the main rim. It is to be observed that since the arms 10 are engaged in the slots 8, the arms cannot swing laterally when the screws are rotated. The nipples 7 act as guides for the sleeves 9, into which the screws 14 and 15 are threaded. Although but four screws 14 and 15 and attendant parts are shown, it will be understood that as many screws and brackets may be used as is considered expedient or necessary.

At times, the fingers 11 may not coöperate properly with the main rim, owing to the fact that rims of vehicle wheels are differently constructed. Under such circumstances, resort may be had to a filler block 18 shown in Fig. 4, one surface 19 of which may be concaved or otherwise constructed, so as to coöperate properly with the rim of the vehicle wheel. The filler block 18 is provided with a longitudinal rib 20 adapted to be seated between the fingers 11, the filler block being supported on the fingers.

Having thus described the invention, what is claimed is:—

1. In an emergency wheel for vehicles, a rim; screws journaled for rotation in the rim and held therein against endwise movement; and laterally extended brackets into which the screws are threaded, the brackets being interengaged with the rim against movement transversely of the axis of rotation of the screws; one of the screws being longer than the remaining screws, whereby said screw and its bracket may be employed as a jack.

2. In an auxiliary wheel for vehicles, a rim provided with nipples having slots; tubular sleeves mounted for right line sliding movement in the nipples and provided with rigid lateral brackets passing outwardly through the slots; and screws threaded into the sleeves, the screws being held against endwise movement in the rim, the brackets coacting with the slots to prevent a swinging of the brackets when the screws are rotated.

In testimony that I claim the foregoing as my own, I have hereto affixed my signature in the presence of two witnesses.

WILLIAM E. BINKLEY.

Witnesses:
JAMES E. BRACKEN,
WALTER C. REYNOLDS.

Copies of this patent may be obtained for five cents each, by addressing the "Commissioner of Patents, Washington, D. C."